J. E. WISNER.
Horse Hay-Rake.

No. 162,132. Patented April 13, 1875.

Witnesses.
C. F. Brown
Melville Church

Inventor
J. E. Wisner
by his Attys.
Hill & Ellsworth

THE GRAPHIC CO. PHOTO-LITH. 39 & 41 PARK PLACE, N.Y.

UNITED STATES PATENT OFFICE.

JAMES E. WISNER, OF FRIENDSHIP, NEW YORK.

IMPROVEMENT IN HORSE HAY-RAKES.

Specification forming part of Letters Patent No. 162,132, dated April 13, 1875; application filed August 1, 1874.

*To all whom it may concern:*

Be it known that I, JAMES E. WISNER, of Friendship, in the county of Allegany and State of New York, have invented certain new and useful Improvements in Horse Hay-Rakes; and I do hereby declare the following to be a full, clear, and exact description thereof, reference being had to the accompanying drawings forming part of this specification, in which—

Figure 1:
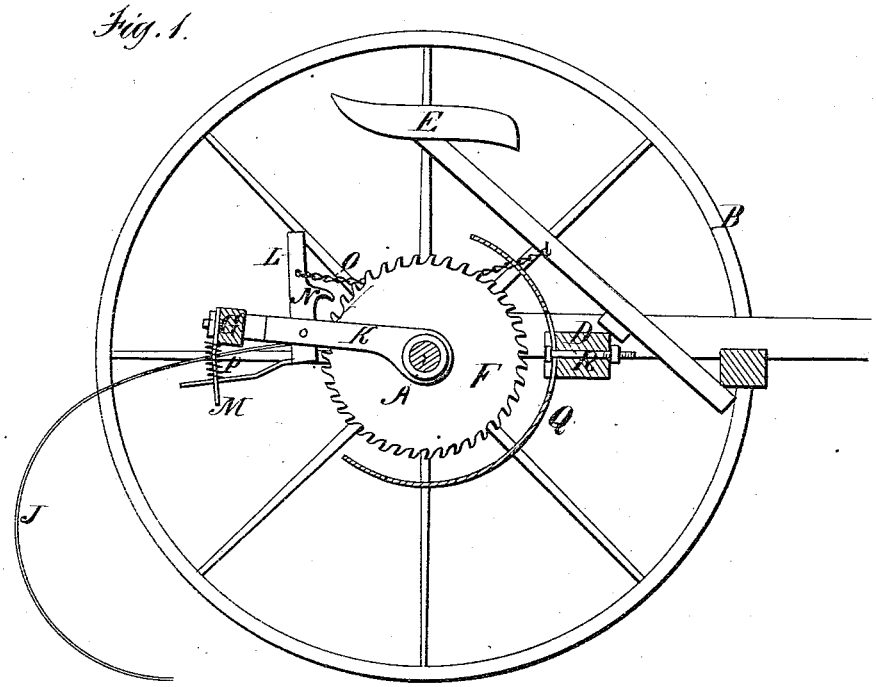
Figure 2:
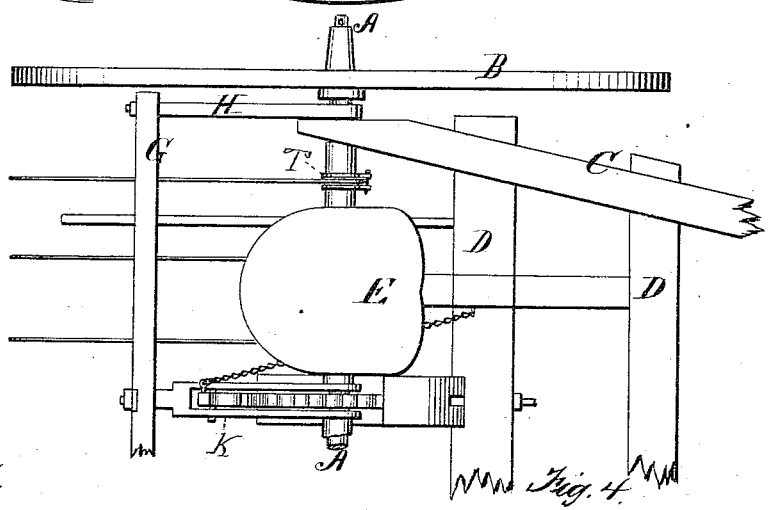
Figure 3:
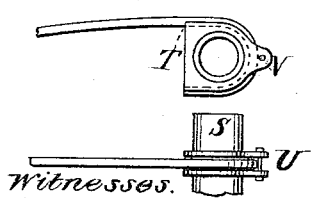
Figure 5:
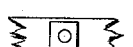
Figure 5:
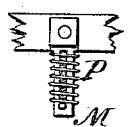
Figure 4:
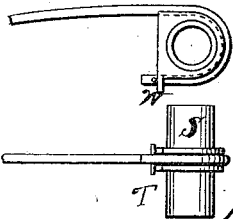

Figure 1 is a longitudinal section of a horse hay-rake, constructed in accordance with my invention. Fig. 2 is a partial plan view. Figs. 3 and 4 are devices showing the method of securing the teeth to the thimbles of the axle; and Fig. 5 is a rear view of the spring and guide for the detent, applied to the lifting-bar.

Similar letters of reference indicate corresponding parts in the several figures of the drawings.

My invention relates to that class of horse hay-rakes in which the hay is automatically dumped by the draft or power of the team, at the will of the operator; and has for its object to simplify the construction and operation of the same.

It consists, first, in the combination of a guard which also performs the function of an adjustable tripping device, with the ratchet-wheel, to prevent the teeth of the latter from catching the cut hay or grain during the operation of raking.

It also consists in the means of attaching the rake-teeth to the axle, as hereinafter more fully set forth.

In the accompanying drawings, A is the axle, secured to the driving-wheels B B, so as to revolve therewith; and C C are the thills, hung upon the axle between the wheels by any suitable means which shall not interfere with its rotation. The thills are connected near their rear ends, in front of the axle, by means of bars D D, to form the rake-frame and support the driver's seat E. F is a ratchet-wheel, secured to the axle at or near the center, so as to revolve therewith, and having its teeth curved or inclined forward. G is the lifting-bar, held in rear of the axle by means of the arms H H, and provided with guide-loops for the passage of the rake-teeth J. Instead of employing the staples or loops for supporting the teeth, the latter may be passed through vertical slots formed in the lifting-bar. These slots should be sufficiently long to permit the vertical play of the teeth, and sufficiently wide to admit of a slight lateral movement. K is a forked or bifurcated arm embracing the rear half of the ratchet-wheel and connecting the lifting bar with the axle, being fitted loosely upon the latter. A right-angular detent, L, is pivoted within the forked arm, in rear of the ratchet-wheel, so that its lower arm shall extend through a guide-staple, M, depending from the lifting-bar, and so that its upper end shall extend above the ratchet-wheel. The vertical portion of this lever is provided with a hook, N, to engage with the teeth of the ratchet-wheel, and is connected by a chain, O, to the seat-standard or other part of the rake-frame. A spring, P, on the guide-staple presses down the lower arm of the detent, to hold the hook out of contact with the ratchet-wheel.

I do not confine myself to this precise construction of the detent, as it may be composed of a simple upright hook-bar, held out of contact with the ratchet-wheel by a coiled spring extending from its upper end to the top of the lifting-bar. By this construction, of course, the guide-staple and its spring are not required. Q is a curved metal plate arranged upon the rear bar D of the thills, immediately in front of the ratchet wheel, and adapted for vertical adjustment by means of the screw-bolt R, or other suitable device. The rake-teeth are each attached to separate thimbles S, mounted loosely upon the axle, as shown, and are secured to the said thimbles in the following manner: The center of each thimble is cast or otherwise provided with a U-shaped rib, T, having a groove in its curved edge—that is to say, a groove extending along the top front and bottom sides—by which the tooth and thimble are kept in the same relative relation. The forward ends of the teeth are curved, as shown in Figs. 3 and 4, and passed around the rib so as to lie within the groove. In this position they are held either by a pin or bolt, U, placed through the lugs V, in front of the tooth, as shown in Fig. 3, or the extreme end of the tooth is provided with a similar pin or bolt in rear of lugs W, as shown in Fig. 4. By removing the pin or bolt in either case, the teeth may be readily taken off of the thimbles when occasion requires. When the rake is in operation and it is desired to raise the teeth for the purpose of dumping the hay into a windrow, the driver presses lightly with his foot upon the chain O, to engage the hook end of the detent with the teeth of the ratchet-wheel. As the rake moves forward the rotation of the ratchet-wheel lifts up the detent, which in its turn raises the lifting-bar and teeth until the top of the detent comes in contact with the upper end of the curved plate, and disengages the hook from the ratchet-wheel, when the teeth fall back by their own gravity into a position for raking. By adjusting the curved guide higher or lower, the distance between its upper end and the detent is lengthened or shortened, and therefore regulates the height to which the teeth may be raised, as well as the length of time they are held in an elevated position. This constitutes a very important feature of my invention, since it adapts the teeth to be raised higher and to be held longer in their raised position when the rake is working in heavy hay than in thin hay. That is to say, by adjusting the guide downward the space between its upper end and the detent is increased, so that when the teeth are elevated they are carried high enough to clear the largest windrows. By adjusting the curved guide upward, the space between its upper end and the detent is decreased, thereby limiting the upward movement of the teeth. The capability of adjusting the throw of the rake-teeth adapts the rake for use in the formation of gavels from cradled grain, where it is necessary that the rake shall operate quickly, its teeth being raised just high enough to clear the gavels and drop over them into the swath. By adjusting the curved guide these results are accomplished which enables the teeth to rise or fall rapidly. It will be observed that the arc through which the pivot of the detent moves is concentric with the rake-axle, the ratchet-wheel, and the path of the lifting-bar, so that the various parts are prevented from being bound or cramped during the operation of raising and dumping the load.

Having thus described my invention, what I claim as new is—

1. The thimbles S S, mounted loosely on the axle, and provided with the grooved U-shaped ribs T, having lugs V V, in combination with the rake-teeth J and bolts U, substantially as described, and for the purposes set forth.

2. The combination of a hooked detent, connected to the lifting-bar, with the ratchet-wheel on the revolving rake-axle, and the adjustable tripping device on the frame of the rake, substantially as described, for the purpose specified.

3. The curved plate Q, adapted to form a guard for the ratchet-wheel, and an adjustable trip for the lifting device, substantially as described.

JAMES E. WISNER.

Witnesses:
RODERICK STEBBINS,
S. P. MORSE.